(12) United States Patent
Gschwind et al.

(10) Patent No.: US 9,582,424 B2
(45) Date of Patent: *Feb. 28, 2017

(54) COUNTER-BASED WIDE FETCH MANAGEMENT

(71) Applicant: INTERNATIONAL BUSINESS MACHINES CORPORATION, Armonk, NY (US)

(72) Inventors: Michael K. Gschwind, Chappaqua, NY (US); Jose E. Moreira, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/186,599

(22) Filed: Jun. 20, 2016

(65) Prior Publication Data

US 2016/0299846 A1  Oct. 13, 2016

Related U.S. Application Data

(63) Continuation of application No. 14/483,576, filed on Sep. 11, 2014, now Pat. No. 9,400,751, which is a (Continued)

(51) Int. Cl.
    G06F 12/08    (2016.01)
(52) U.S. Cl.
    CPC ...... *G06F 12/0862* (2013.01); *G06F 12/0891* (2013.01); *G06F 2212/602* (2013.01)

(58) Field of Classification Search
    CPC ........... G06F 12/0862; G06F 2212/251; G06F 2212/602; G06F 12/0886; G06F 12/0871;
    (Continued)

(56) References Cited

U.S. PATENT DOCUMENTS

| 4,315,312 A * | 2/1982 | Schmidt | G06F 12/0864 711/172 |
| 7,822,926 B2 * | 10/2010 | Croxford | G06F 12/0886 711/129 |

(Continued)

FOREIGN PATENT DOCUMENTS

JP         2004259109 A  *  9/2004

*Primary Examiner* — Adam M Queler
*Assistant Examiner* — Alex Olson
(74) *Attorney, Agent, or Firm* — Cantor Colburn LLP; Steven Bennett (57) ABSTRACT

Embodiments relate to counter-based wide fetch management. An aspect includes assigning a counter to a first memory region in a main memory that is allocated to a first application that is executed by a processor of a computer. Another aspect includes maintaining, by the counter, a count of a number of times adjacent cache lines in the cache memory that correspond to the first memory region are touched by the processor. Another aspect includes determining an update to a data fetch width indicator corresponding to the first memory region based on the counter. Another aspect includes sending a hardware notification from a counter management module to supervisory software of the computer of the update to the data fetch width indicator. Yet another aspect includes updating, by the supervisory software, the data fetch width indicator of the first memory region in the main memory based on the hardware notification.

20 Claims, 6 Drawing Sheets

Related U.S. Application Data continuation of application No. 14/253,086, filed on Apr. 15, 2014, now Pat. No. 9,411,735.

(58) Field of Classification Search
CPC ..... G06F 2212/6026; G06F 2212/6028; G06F 9/30123; G06F 9/30134; G06F 9/3861
See application file for complete search history.

(56) References Cited

U.S. PATENT DOCUMENTS

| | | | | |
|---|---|---|---|---|
| 7,904,661 | B2* | 3/2011 | Fluhr | G06F 12/0862 711/100 |
| 8,250,303 | B2* | 8/2012 | Bernstein | G06F 12/0886 711/118 |
| 2003/0172224 | A1* | 9/2003 | Gulick | G06F 12/0879 711/1 |
| 2003/0196044 | A1* | 10/2003 | Ramirez | G06F 9/3802 711/137 |
| 2004/0030839 | A1* | 2/2004 | Southwell | G06F 12/0862 711/137 |
| 2006/0294347 | A1* | 12/2006 | Zou | G06F 9/3009 712/244 |
| 2007/0198779 | A1* | 8/2007 | Wang | G06F 12/123 711/136 |
| 2007/0237326 | A1* | 10/2007 | Nonaka | H04L 9/0631 380/37 |
| 2009/0177845 | A1* | 7/2009 | Moyer | G06F 12/0831 711/146 |
| 2009/0271576 | A1* | 10/2009 | Yamada | G06F 9/30043 711/137 |
| 2011/0078382 | A1* | 3/2011 | Bernstein | G06F 12/0886 711/128 |
| 2011/0119426 | A1* | 5/2011 | Boyle | G06F 12/0862 711/3 |
| 2011/0173503 | A1* | 7/2011 | Salapura | G06F 11/348 714/45 |
| 2011/0173588 | A1* | 7/2011 | Salapura | G06F 11/348 717/124 |
| 2012/0054447 | A1* | 3/2012 | Swart | G06F 12/0888 711/136 |
| 2012/0096227 | A1* | 4/2012 | Dubrovin | G06F 12/0862 711/137 |
| 2012/0254540 | A1* | 10/2012 | Kou | G06F 12/0862 711/122 |
| 2012/0284489 | A1* | 11/2012 | Plondke | G06F 9/30192 712/226 |
| 2013/0111147 | A1* | 5/2013 | Mogul | G06F 12/0802 711/137 |
| 2013/0246708 | A1* | 9/2013 | Ono | G06F 12/0862 711/122 |
| 2013/0339626 | A1* | 12/2013 | Alexander | G06F 12/0855 711/143 |
| 2014/0075156 | A1* | 3/2014 | Blasco-Allue | G06F 9/3802 712/205 |
| 2014/0379953 | A1* | 12/2014 | Heyrman | G06F 13/1689 710/308 |

\* cited by examiner

COUNTER-BASED WIDE FETCH MANAGEMENT

DOMESTIC PRIORITY

This application is a continuation of and claims priority from U.S. patent application Ser. No. 14/483,576, filed on Sep. 11, 2014, entitled "COUNTER-BASED WIDE FETCH MANAGEMENT", which in turn claims priority from U.S. patent application Ser. No. 14/253,086, filed on Apr. 15, 2014, the entire contents of all of the applications listed above are incorporated herein by reference.

BACKGROUND

The present invention relates generally to computer systems, and more specifically, to counter-based wide fetch management in a computer system.

In the field of computing, a cache is a small, fast memory or storage device used to store data or instructions that were accessed recently, are accessed frequently, or are likely to be accessed in the future, by a processor. Reading from or writing to a cache is typically cheaper (in terms of access time and/or resource utilization) than accessing other memory or storage devices in a computer system. Once data is fetched from main memory and stored in the cache, the data can be accessed in the cache instead of re-fetching the data from main memory, saving both time and resources. A cache is made up of units of storage referred to as cache lines having a cache line size, and each cache line has an associated cache tag that references the cache line. Data may be fetched from the main memory in units equal to the cache line size for installation in the cache.

SUMMARY

Embodiments include a method and computer program product for counter-based wide fetch management. An aspect includes assigning, by a counter management module, a counter of a plurality of counters to a first memory region in a main memory that is allocated to a first application that is executed by a processor of a computer. Another aspect includes maintaining, by the counter, a count of a number of times adjacent cache lines in the cache memory that correspond to the first memory region are touched by the processor in conjunction with the execution of the first application by the processor. Another aspect includes determining, by the counter management module, an update to a data fetch width indicator corresponding to the first memory region based on the counter. Another aspect includes sending a hardware notification from the counter management module to supervisory software of the computer of the update to the data fetch width indicator corresponding to the first memory region. Yet another aspect includes updating, by the supervisory software, the data fetch width indicator of the first memory region in the main memory based on the hardware notification

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of counter-based wide fetch management are provided, with exemplary embodiments being discussed below in detail. Some applications that are executed by a computer system may require a relatively large amount of adjacent data, and benefit from wider (larger) cache lines, while other applications may benefit from narrower (smaller) cache lines, which have more associativity and more index bits. Therefore, a cache may be designed to have a relatively narrow cache line length (for example, 32 bytes or 64 bytes in some embodiments), and fetches to populate cache entries in the cache may correspond to one cache line, or may correspond to multiple cache lines, as needed by the application associated with the cache entry. The size of a cache entry is determined based on a data fetch width indicator associated with the location in the main memory from which the data in the cache entry was fetched. The data fetch width indicators may be set on a per-memory page basis using counters that are associated with applications that have been allocated memory pages. The data fetch width indicators may, in various embodiments, be set in page table entries in a page table of the computing system, or in memory-area property storage comprising extra bits associated with each memory block in the main memory.

In at least one embodiment, the data fetch width indicator is stored in conjunction with a segment table entry, e.g., in an SLB entry (SLBE) of an SLB in accordance with the Power ISA. In at least one other embodiment, the data fetch width indicator is stored in conjunction with key storage associated with a page in accordance with z/Architecture. For instance, environments based on the PowerPC architecture, also referred to as Power ISA, offered by International Business Machines Corporation (IBM®) and described in the Power ISA™ Version 2.06 Revision B specification, Jul. 23, 2010, hereby incorporated by reference herein in its entirety, may include one or more aspects, as well as computing environments of other architectures, such as the z/Architecture, offered by International Business Machines Corporation, and described in z/Architecture—Principles of Operation, Publication No. SA22-7932-09, 10th Edition, September 2012, which is hereby incorporated by reference herein in its entirety.

Embodiments of counter-based wide fetch management are responsive to system conditions. In a system where high cache pressure causes cache lines to be evicted more quickly, cache fetches will be scaled to fetch narrow cache entries (i.e., those comprising fewer cache lines) when individual cache lines of a cache entry are unlikely to persist in the cache long enough to be profitably used and the cost of performing the wide fetch can be amortized by associated benefits of such cache lines having been prefetched. By deallocating counters after a number of fetches have elapsed, a time period has elapsed, or after a threshold has been reached reduces the cost of data use indication, e.g., with respect to interference with other processor operations, and power consumption In some embodiments, data fetch width indicators may be initially set for a memory page based on a type of the application for which the memory page is allocated. For example, database or high performance computing (HPC) workloads may have a relatively wide data fetch width indicator (e.g., 2 to 4 cache lines per data fetch), while other workloads, such as scripting languages (e.g., for domain-specific languages, or DSLs), may have a relatively narrow data fetch width indicator (e.g., a single cache line per data fetch). In other embodiments, data fetch width indicators may be initialized to a default value for all applications in the computing system. In further embodiments, the behavior of the application is monitored during execution, and the data fetch width for a memory region or a memory page allocated to the application is updated based on the monitoring. In some embodiments, the monitoring comprises maintaining a counter of a number of times the application has accessed adjacent cache lines in a particular memory page, and, based on the counter reaching a threshold, increasing the data fetch width indicator associated with the memory page.

The monitoring may be implemented in a hardware module comprising a counter management module that determines updated data fetch width indicators based on identification of whether wide or narrow data fetches are appropriate for a particular memory region, which may comprise one or more memory pages in some embodiments, or a portion of a memory page in other embodiments. In some embodiments, single-bit use indicators are provided in each cache line in the cache memory, and the counter management module maintains a count of how often adjacent cache lines were touched based on the use indicators. If the counter for a memory region exceeds a threshold, the data fetch width indicator of the memory region is updated to allow wide fetches, or to increase the fetch size. In further embodiments, the counter for memory region may be disabled based on one of: enabling of wide fetch for the memory region, elapsing of a predetermined time period since assigning the counter to the memory region, and performing a predetermined number of fetches to the cache memory from the memory region. A disabled counter may be reused by a different memory region. In further embodiments, the counter management module determines a value for a data fetch width indicator for a memory region, and sends a hardware notification to supervisory software of the computer system, and the supervisory software sets the data fetch width indicator for the memory region based on the notification.

In various embodiments, a use indicator may be updated to indicate that a cache line was touched based one or more of a read access of the cache line, a write access of the cache line, and zeroing of the cache line by a dcbz instruction, which comprises instruction that fills a fixed-size chunk of memory with zeroes. The dcbz instruction may correspond to a fraction of a cache line in one embodiment, or correspond to an entire cache line in another embodiment.

In further embodiments, the cache memory is divided into blocks of N bytes, and a counter is maintained for each block in each level of cache. For example, in a processor with 3 levels of cache, there are 3 counters for each block. A counter(A,L) is a counter associated with a block at address A and cache level L. The cache memory is further organized as S sets of E elements each, and the elements are each cache lines having a cache line size (for example, 64 bytes). In this example, if two of those 64-byte cache lines from a contiguous 128 bytes in a memory page are fetched into the cache memory, the two cache lines are located in consecutive sets. In such an embodiment, the counters may be managed as follows: when there is a miss for an element at address A at cache level L, then, if counter(A,L)>=Threshold, wide fetch for the memory page in which the element is located is enabled; further, when an element at address A is evicted from the cache level L, if both 64-byte elements of a contiguous 128 bytes were touched (e.g., accessed for read-access, accessed for write access, and in at least one embodiment, zeroed by a dcbz instruction corresponding to a fraction of a cache line in one embodiment, and optionally corresponding to an entire cache line in another embodiment) in the cache (determined based on the use indicators), counter(A,L) is incremented; otherwise, counter(A,L) is decremented. In further embodiments, there may not be one counter per level of cache, rather, there may be one counter that is associated with one level of the cache.

Figure 1:
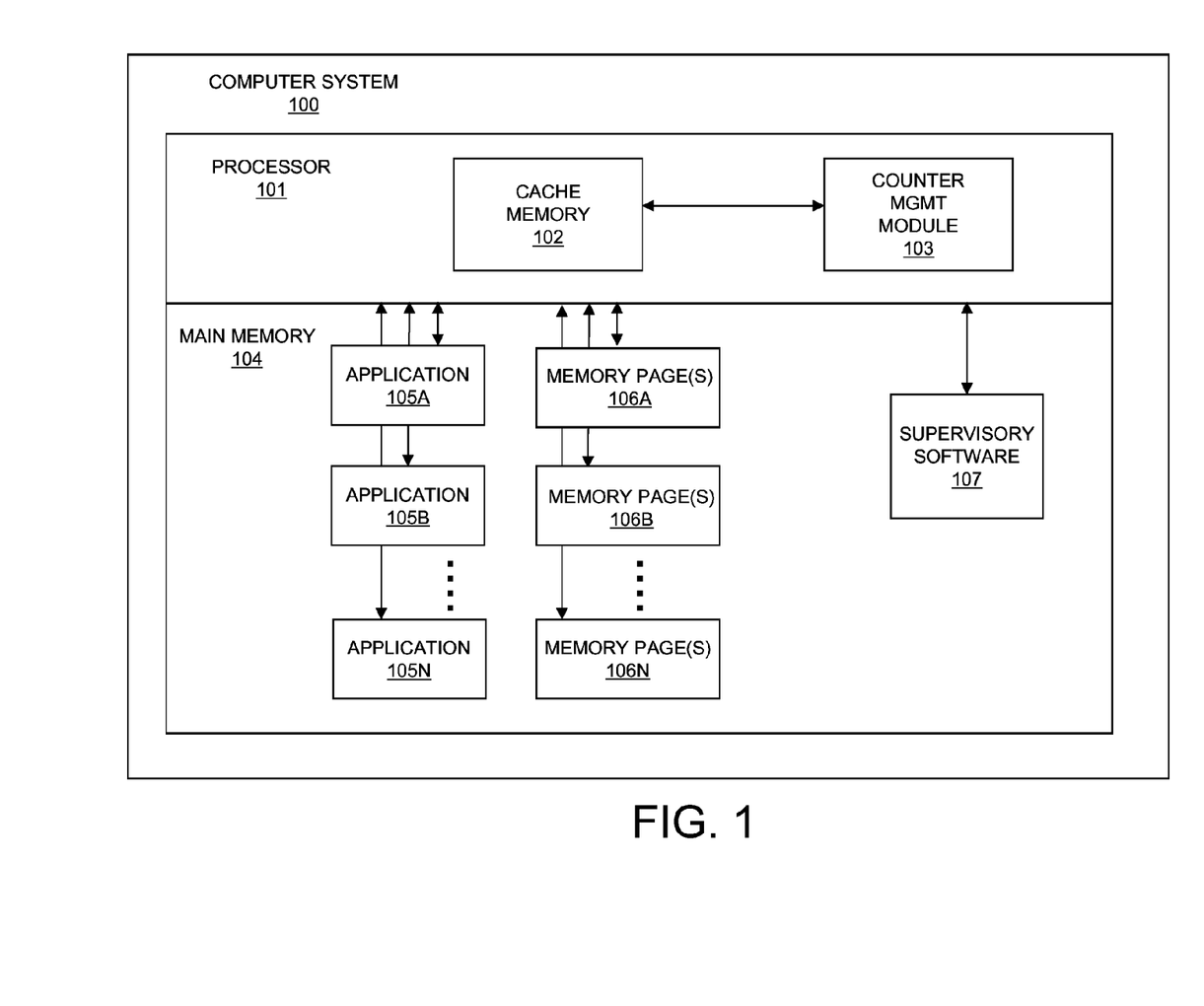
FIG. 1 depicts a computer system including counter-based wide fetch management in accordance with an embodiment.

Turning now to FIG. 1, a computer system 100 is generally shown. Computer system 100 includes a processor 101 and a main memory 104. Processor 101 includes a cache memory 102 that is used for local storage within processor 101. Processor 101 executes a plurality of applications 105A-N, which are located in main memory 104. Each of applications 105A-N has at least one respective allocated memory page(s) 106A-N that is used to store data corresponding to the application 105A-N (e.g., memory page(s) 106A are allocated to application 105A, etc.). Computer system 100 further comprises a hardware counter management module 103 in communication with cache memory 102, which comprises a hardware mechanism for adjusting data fetch width indicators for memory page(s) 106A-N. Supervisory software 107, which may comprise one or more of an operating system and a hypervisor, also runs on computer system 100. FIG. 1 is shown for illustrative purposes only; in various embodiments, a computer system may execute any appropriate number of applications such as applications 105A-N, and may include any appropriate number of levels of cache memory.

Figure 2:
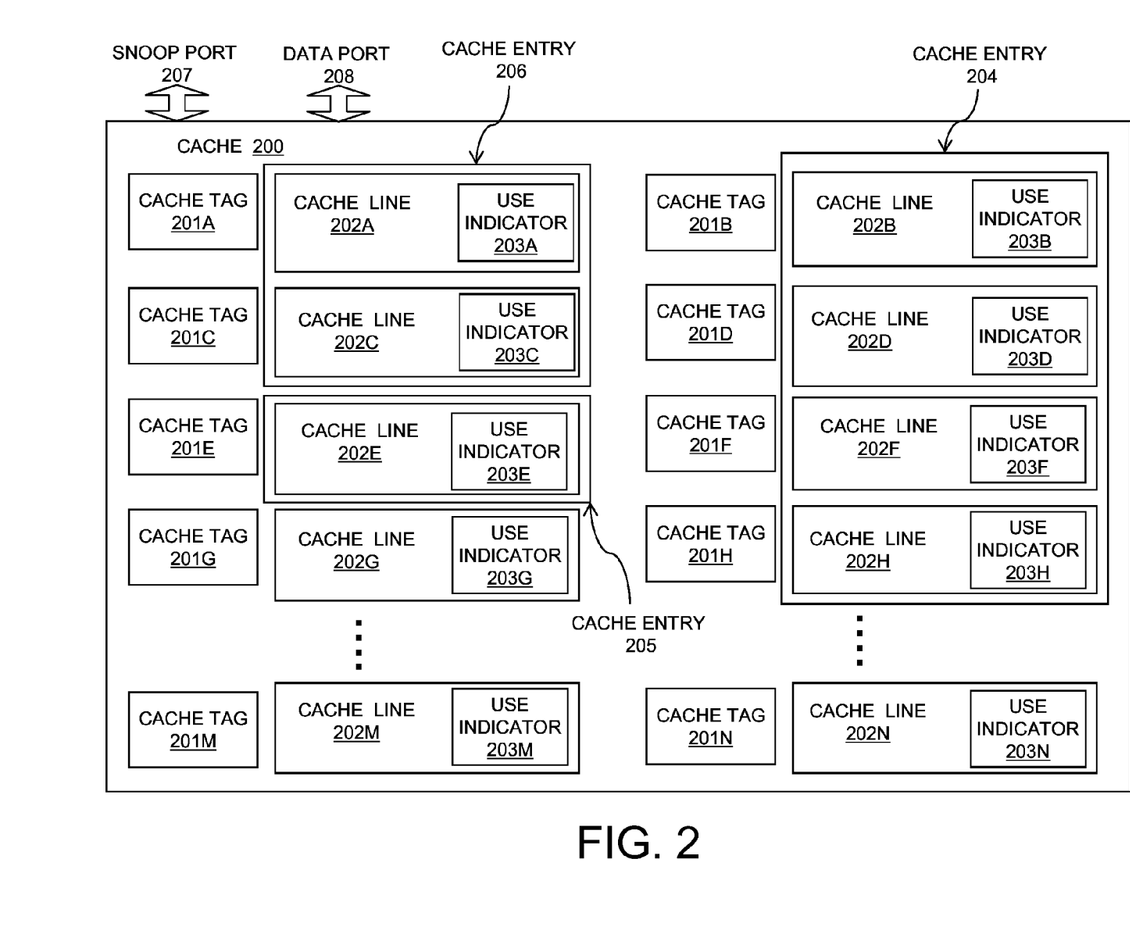
FIG. 2 depicts a cache memory for use with counter-based wide fetch management in accordance with an embodiment.

FIG. 2 illustrates an embodiment of a cache memory 200. Cache memory 200 may comprise cache memory 102 of FIG. 1. Cache memory 200 includes a plurality of cache lines 202A-N, each referenced by a respective cache tag 201A-N. Cache entries, such as cache entries 205-206, may comprise one or more of cache lines 202A-N. The number of cache lines in a cache entry such as cache entries 202-205 is determined based on the data fetch width indicator that is stored in the page table entry associated with the memory page from which the data in the cache entry was fetched. Each of example cache entries 202-205 is associated with a memory page in the main memory that has a different respective data fetch width indicator in its page table entry.

In one embodiment, when a data access is made, an access to a first portion of a cache entry 206 corresponding to cache line 202A is performed in conjunction with a tag match of cache tag 201A; an access to a second portion of a cache entry 206 corresponding to cache line 202C is performed in conjunction with a tag match of cache tag 201C; an access to a first portion of a cache entry 204 corresponding to cache line 202B is performed in conjunction with a tag match of cache tag 201B; an access to a second portion of a cache entry 204 corresponding to cache line 202D is performed in conjunction with a tag match of cache tag 201D; an access to a third portion of a cache entry 204 corresponding to cache line 202F is performed in conjunction with a tag match of cache tag 201F; an access to a fourth portion of a cache entry 204 corresponding to cache line 202H is performed in conjunction with a tag match of cache tag 201H. Thus, a hit and miss indication can be separately determined for each cache line that is part of a single cache entry. In at least one such embodiment, not all cache line constituents of a single cache entry are located in the same associativity class in the cache memory 200. For example, in accordance with an embodiment, a cache entry may comprise cache line 202A with associated cache tag 201A, and cache line 202D with associated cache tag 201D.

In another embodiment, a single cache tag is used for an entire entry. In accordance with such embodiments, cache lines 202A and 202C in cache entry 206 are referenced by cache tag 201A; cache lines 202B, 202D, 202F, and 202H in cache entry 204 are referenced by cache tag 201B; and cache line 202E in cache entry 205 is referenced by cache tag 201E. In some embodiments, all cache lines of a single cache entry are placed in the same associativity class in the cache memory 200. In conjunction with a cache size entry indicator associated with each cache entry, cache tag matching may be performed using a single cache tag for all the cache lines that make up a cache entry.

Cache lines 202A-N may have any appropriate size in various embodiments. For example, each of cache lines 202A-N may be 32 bytes in some embodiments; in such embodiments, cache entry 206 is 64 bytes, cache entry 204 is 128 bytes, and cache entry 205 is 32 bytes. In another example, each of cache lines 202A-N may be 64 bytes in some embodiments; in such embodiments, cache entry 206 is 128 bytes, cache entry 204 is 256 bytes, and cache entry 205 is 64 bytes.

Each cache line 202A-N includes a respective use indicator 203A-N comprising a 1-bit field that indicates whether the cache line has been touched by the processor 101. When a cache line is installed in cache memory 200, the associated use indicator is set to untouched (for example, 0); when the cache line is touched by the processor 101, the associated use indicator is set to touched (for example, 1). The cache memory 200 also includes a separate data port 208 that is used to install data in the cache memory 200 and to access data in the cache memory 200 by processor 101 in conjunction with tag match logic (not shown) to determine hits and misses in the cache memory 200. In some embodiments, the cache memory 200 further includes a snoop port 207, which may be used by a tag match logic (not shown) of the computer system to determine hits and misses in the cache memory 200 in order to determine whether remote processor data requests from memory refer to data currently resident in cache memory 200. In accordance with one embodiment, the counter management module 103 that was shown in FIG. 1 operates in conjunction with data port 208. In accordance with another embodiment, the counter management module 103 that was shown in FIG. 1 operates in conjunction with snoop port 207 such that the operations of the counter management module 103 do not conflict with data operations concurrently being performed via data port 208. FIG. 2 is shown for illustrative purposes only; a cache memory may have any appropriate number of cache lines and cache entries, and the cache entries may each span any appropriate number of cache lines. Further, in some embodiments, the cache memory includes an additional port that is distinct from the snoop and data port and that is used by the counter management module 103.

In various embodiments, a use indicator of use indicators 203A-N may be updated to indicate that its respective cache line was touched based one or more of a read access of the cache line, a write access of the cache line, and zeroing of the cache line by a dcbz instruction, which comprises instruction that fills a fixed-size chunk of memory with zeroes. The dcbz instruction may correspond to a fraction of a cache line in one embodiment, or correspond to an entire cache line in another embodiment.

Figure 3:
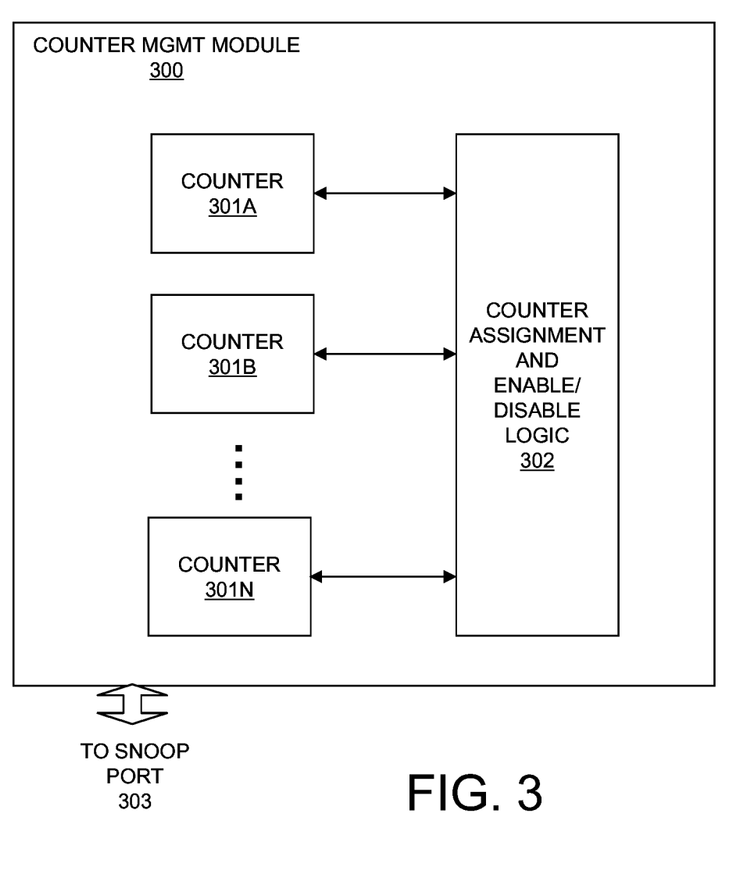
FIG. 3 depicts a counter management module for counter-based wide fetch management in accordance with an embodiment.

FIG. 3 illustrates an embodiment of a counter management module 300. Counter management module 300 may comprise counter management module 103 of FIG. 1. Counter management module 300 includes a plurality of counters 301A-N, and a counter assignment and enable/disable logic 302. The counter management module 300 further includes an interface 303 to a snoop port of a cache memory such as cache memory 102/200, or to another port to cache memory 200. Counter assignment and enable/disable logic 302 assigns counters of counters 301A-N to memory regions of memory pages 106A-N that are allocated to applications such as applications 105A-N, and increments and decrements the counters 301A-N as needed based on accesses of adjacent lines in the cache memory. Counter assignment and enable/disable logic 302 further determines if a counter of counters 301A-N is above a predetermined threshold, and, based on determining that a counter of counters 301A-N is above the predetermined threshold, causes a hardware notification to be sent to the supervisory software 107 so that supervisory software 107 may update the data fetch width indicator of memory region of memory page(s) 106A-N that is associated with the counter. Counter assignment and enable/disable logic 302 further determines if a predetermined time period or a predetermined number of fetches have elapsed since the assignment of a counter of counters 301A-N, and if the predetermined time period or the predetermined number of fetches have elapsed, disables the counter. A disabled counter may be reassigned to a subsequent memory region of an application. FIG. 3 is shown for illustrative purposes only; a counter management module may include any appropriate number of counters, and may, in some embodiments, be connected to an additional port of the cache memory that is distinct from both the snoop port and the data port.

In some embodiments of a counter management module 300, counters 301A-N are stored in a separate counter array. In some embodiments, a counter is associated with a memory block and may optionally be stored in conjunction with a translation structure for translating addresses of memory blocks that are organized as a cache of recent address translations for blocks of memory.

Figure 4:
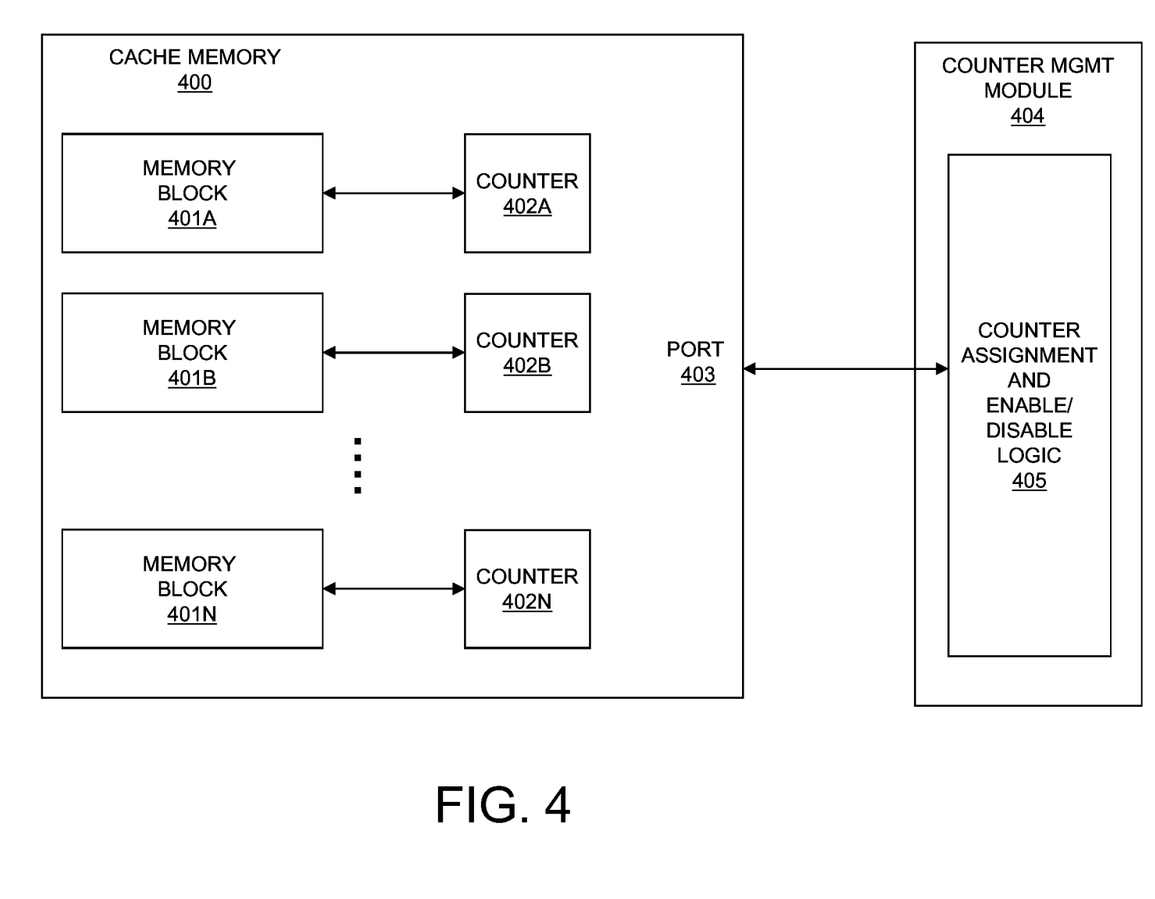
FIG. 4 depicts a cache memory and counter management module for counter-based wide fetch management in accordance with an embodiment.

FIG. 4 illustrates an embodiment of a counter management module 404, in conjunction with a cache memory 400. Counter management module 404 may comprise counter management module 103 of FIG. 1, and cache memory 400 may comprise one of a translation lookaside buffer (TLB), a segment lookaside buffer (SLB), and an effective to real address table (ERAT). In the embodiment of FIG. 4, the cache memory 400 comprises a plurality of memory blocks 401A-N, and a respective counter 402A-N is maintained in the cache memory 400 for each memory block 401A-N. The memory blocks 401A-N may be about 4 kilobytes each in some embodiments. Each counter 402A-N may be assigned to addresses in the counter's respective memory block of memory blocks 401A-N. The counters 402A-N are managed by counter assignment and disable/enable logic 405 in counter management module 404 via port 403, as described above with respect to counter management module 300 of FIG. 3. FIG. 4 is shown for illustrative purposes only; a cache memory may comprise any appropriate number of memory blocks of any appropriate size, and each memory block may have any appropriate number of associated counters.

In at least one embodiment, cache memory 400 corresponds to a cache of address translations. In one embodiment, cache memory 400 comprises a TLB and stores virtual to physical (or real) memory addresses translations. In one such embodiment, each memory block 401A-401N corresponds to a memory page. In another embodiment, a plurality of memory pages comprise to a single memory block of memory blocks 401A-N and are associated with a single counter 402A-N. In one embodiment, each counter of counters 402A-N is statically associated with a respective memory block 401A-N. In another embodiment, a counter 402A-N is assigned to a memory bock by counter assignment logic 405. In one embodiment, data fetch width indicators are associated with pages translated by the TLB. In another embodiment, in which a plurality of memory pages comprise a memory block, data fetch width indicators are associated with pages translated by the TLB. In another embodiment, in which a plurality of memory pages comprise a memory block, data fetch width indicators are associated with memory blocks comprising multiple memory pages translated by the TLB.

In further embodiments, cache memory 400 corresponds to a SLB and stores effective to virtual memory addresses translations. In one embodiment, such segment address translations are performed in accordance with the Power ISA. In one such embodiment, each memory block 401A-N corresponds to a memory segment. In another embodiment, a plurality of memory segments correspond to a memory block 401A-N and are associated with a single counter 402A-N. In another embodiment, a portion of a segment corresponds to a memory block 401A-N and is associated with a single counter 402A-N. In one embodiment, each counter of counters 402A-N is statically associated with each memory block 401A-N. In another embodiment, a counter 402A-N is assigned to a memory block by counter assignment logic 405. In one embodiment, data fetch width indicators are associated with segments translated by the SLB. In another embodiment, in which a plurality of memory segments constitute a memory block, data fetch width indicators are associated with segments translated by the SLB. In another embodiment, in which a portion of a memory segment constitutes a memory block, multiple data fetch width indicators are associated with segments translated by the SLB. In another embodiment, in which one of segments, pluralities of segments, and portions of segments correspond to a memory counters, data fetch width indicators are associated with memory pages. In one such embodiment, data fetch width indicators are stored in one of a TLB, an effective to real address table (ERAT), a page table, a separate data fetch width cache, and key storage.

In further embodiments, cache memory 400 corresponds to ERAT and stores effective to real (or physical) memory addresses translations. In one such embodiment, each memory block 401A-N corresponds to a memory page translated by the ERAT. In another embodiment, a plurality of memory pages translated by the ERAT correspond to a memory block 401A-N and are associated with a single counter of counters 402A-N. In one embodiment, each counter of counters 402A-N is statically associated with each memory block 401A-N. In another embodiment, a counter 402A-N is assigned to a memory block by counter assignment logic 405. In one embodiment, data fetch width indicators are associated with pages translated by the ERAT. In another embodiment, in which a plurality of memory pages comprise a memory block, data fetch width indicators are associated with pages translated by the ERAT. In another embodiment, in which a plurality of memory pages comprise a memory block, data fetch width indicators are associated with memory blocks consisting of multiple pages translated by the ERAT.

In at least one embodiment, when an address translation for a memory block of memory blocks 401A-N is evicted from cache memory 400, an associated counter of counters 402A-N is deallocated for the associated memory block. In one embodiment, when an address translation is evicted, a value of deallocated associated counter 402A-N is stored in storage. In accordance with one embodiment, the value is stored in another cache structure, e.g., when an ERAT address translation is deallocated, a counter may be stored in a corresponding TLB entry. In another embodiment, the counter value is stored in cache memory 200, e.g., optionally in a transient cache storage with discard function for disposable data. In another embodiment, storage of the counter value is in main memory 104. In accordance with one embodiment, storage of the counter value is performed automatically by hardware. In another embodiment, a notification step is performed to supervisory software 107 and the counter value is stored by supervisory software 107. In at least one embodiment, when a counter 402A-N has been deallocated, the counter is allocated to a new memory block. When the counter is allocated to a new memory block, in one embodiment, the counter is initialized to 0. In another embodiment in which a previous counter value for an associated memory block has been stored, the stored counter value is retrieved and used to initialize the newly allocated counter.

Figure 5:
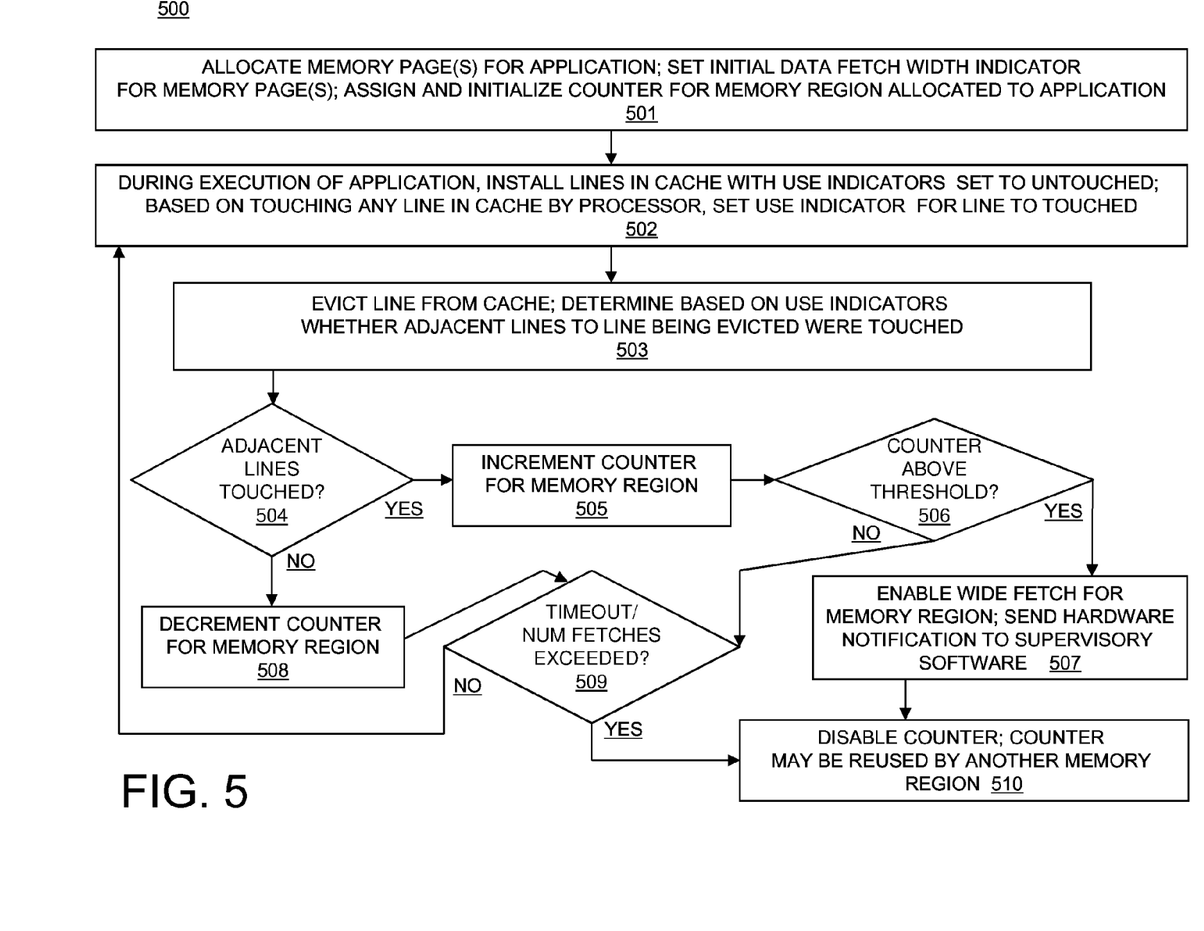
FIG. 5 depicts a process flow counter-based wide fetch management in accordance with an embodiment.

FIG. 5 illustrates an embodiment of a method for counter-based wide fetch management. FIG. 5 is discussed with respect to FIGS. 1-4. First, in block 501, an application, such as application 105A, starts execution by processor 101, and at least one memory page such as memory page(s) 106A are allocated in main memory 104 for the application 105A. An initial data fetch width indicator, which may correspond to a narrow cache line size, is set for the allocated memory page(s) 106A. The data fetch width indicator may be set in a page table entry associated with the memory page(s) 106A in some embodiments, or in memory-area property storage in the memory page(s) 106(A) in main memory 104 in other embodiments. Further, in block 501, a counter, which may be one of counters 301A-N shown in FIG. 3, or counters 402A-N as shown in FIG. 4, is assigned and initialized for a memory region that is allocated to application 105A by counter management module 103. The memory region may comprise one or more of memory page(s) 106A in some embodiments or a portion of a memory page of memory page(s) 106A in other embodiments. Multiple counters may be assigned to a single application such as application 105A; each counter corresponds to a single memory region.

Next, in block 502, during execution of application 105A, cache lines, such as cache lines 202A-N, are installed in the cache memory 102 from memory page(s) 106A. When a cache line is installed, the cache line's associated use indicator 203A-N is set to untouched. When the processor 101 touches the line during execution of the application 105A, the associated use indicator 203A-N is set to touched. In various embodiments, a use indicator 203A-N may be updated to indicate that the use indicator's respective cache line was touched based one or more of a read access of the cache line, a write access of the cache line, and zeroing of the cache line by a dcbz instruction, which comprises instruction that fills a fixed-size chunk of memory with zeroes. The dcbz instruction may correspond to a fraction of a cache line in one embodiment, or correspond to an entire cache line in another embodiment.

Next, in block 503, a line, such as cache line 202A, that is associated with a memory region of memory page(s) 106A is evicted from the cache 200, and it is determined by counter management module 103 whether an adjacent line, such as cache line 202B, was also touched based on use indicator 203B. Table 1 illustrates a pseudocode example of block 503 for an embodiment where a cache entry can comprise up to 2 cache lines:

TABLE 1

Pseudocode for determining whether adjacent lines have been touched

```
// assume element[i][set] is to be evicted, having fields element[i][set].tag
to store a tag,
// element[i][set].valid to store valid bit,
// element[i][set].accessed to store whether a cache line has been accessed
(touched)
//etc.
both_halves_touched <= FALSE;
for j in element_count
   if (element[j][set XOR 1].tag == element[i][set].tag)
      if (element[j][set XOR 1].accessed)
         both_halves_touched <= TRUE;
both_halves_touched <= both_halves_touched AND element[i][set].
accessed;
```

In accordance with the pseudocode example of Table 1, in at least one embodiment, the cache tag comparison for up to j tag matches corresponding to j associative elements in an associativity class are performed in parallel by tag match logic associated to a data port 208 to perform cache hit/miss determination and way selection in conjunction with a data port 208, or by tag match logic associated to a cache snoop port 207 to perform interference determination based on snooping remote processor data accesses, or protocol requests, in accordance with the operation of snoop port 207 to perform multi-processor coherence actions.

Next, in block 504, if it was determined that both adjacent lines of a prospective wide cache entry were touched (accessed), flow proceeds to block 505, in which the counter associated with the memory region that is assigned to the counter is incremented by counter management module 103. Flow then proceeds to block 506, in which it is determined whether the counter that was incremented in block 505 is above a predetermined threshold. In some embodiments of block 506, it may also be determined whether a predetermined number of fetches have been performed from the memory region; if the predetermined number of fetches have not been performed, it may be determined that the counter is not above the predetermined threshold in block 506, so as to avoid having a low number of fetches cause an over-threshold condition. If it is determined in block 506 that the counter is above the threshold, flow proceeds to block 507, and wide fetch is enabled for the memory region. This may be performed by sending a hardware notification from counter management module 103 to supervisory software 107. In one embodiment, the hardware notification consists of an exception being raised, with control being transferred to supervisory software 107. Supervisory software 107 may then update the data fetch width indicator of the memory region based on the notification. In one embodiment, when a counter has been assigned to a plurality of pages or regions, a plurality of data fetch width indicators are updated. The data fetch width indicator may be updated by the supervisory software 107 in a page table entry associated with the memory region in some embodiments, or in memory-area property storage in the memory region in main memory 104 in other embodiments. Flow then proceeds from block 507 to 510, in which the counter associated with the memory region is disabled based on wide fetch having been enabled for the memory region; the counter may then be reassigned for use by another memory region by counter management module 103. If it was determined in block 506 that the counter is not above the threshold, flow proceeds from block 506 to block 509, which is discussed below.

If it was determined in block 504 that adjacent lines were not touched (accessed), flow proceeds from block 504 to block 508, in which the counter associated with the memory region is decremented. Flow then proceeds to block 509, in which it is determined whether a predetermined amount of time or predetermined number of fetches have elapsed since the particular counter was assigned and initialized in block 501. If it is determined in block 509 that the predetermined amount of time or predetermined number of fetches have elapsed since the counter was assigned and initialized in block 501, flow proceeds from block 509 to block 510, in which the counter associated with the memory region is disabled; the counter may be reassigned for use by another memory region by counter management module 103. If it is determined in block 509 that the predetermined amount of time or predetermined number of fetches have not elapsed since the counter was assigned and initialized in block 501, flow proceeds from block 509 to back to block 502, and execution of the application 105A continues.

Technical effects and benefits include tailoring the width of data fetches to the workload for which the data is fetched.

Figure 6:
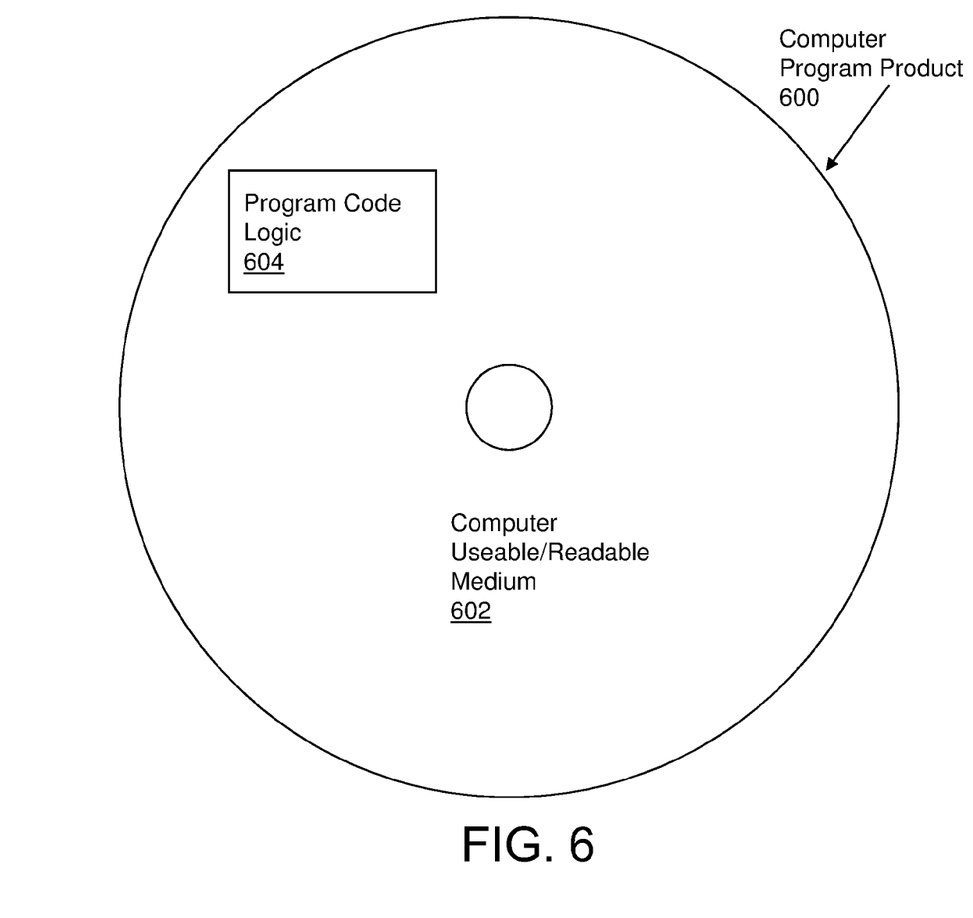
FIG. 6 illustrates a computer program product in accordance with an embodiment.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for counter-based wide fetch management in a computer system that comprises a processor, a cache memory, and a main memory, the method comprising:

assigning, by a counter management module, a counter from a set of counters, to a first memory region in the main memory, wherein the first memory region is allocated to a first application that is executed by the processor;

maintaining, by the counter, a count of a number of times adjacent cache lines in the cache memory corresponding to the first memory region are touched by the processor within a predetermined duration since the assigning of the counter to the first memory region, wherein the processor touches the cache lines in conjunction with execution of the first application;

updating, by the counter management module, a data fetch width indicator corresponding to the first memory region in response to the count being at least a predetermined threshold value within the predetermined duration since the assigning of the counter to the first memory region; and assigning, by the counter management module, the counter to a second memory region in the main memory in response to the count being less than the predetermined threshold value within the predetermined duration since the assigning of the counter to the first memory region.

2. The computer-implemented method of claim 1, further comprising disabling the counter by the counter management module in response to the count being at least the predetermined threshold value within the predetermined duration since the assigning of the counter to the first memory region.

3. The computer-implemented method of claim 1, further comprising disabling the counter by the counter management module based on the elapsing of the predetermined duration.

4. The computer-implemented method of claim 1, further comprising:
- determining, by the counter management module, that a predetermined number of fetches from the main memory to the cache memory have been performed from the first memory region since the assigning of the counter to the first memory region;
- disabling the counter by the counter management module based on the performing of the predetermined number of fetches; and
- in response, reassigning the counter to a second memory region in the main memory, the second memory region being distinct from the first memory region.

5. The computer-implemented method of claim 1, wherein the set of counters is stored in one of the counter management module and the cache memory.

6. The computer-implemented method of claim 1, wherein the data fetch width indicator is stored in a page table entry associated with the first memory region.

7. The computer-implemented method of claim 1, wherein the data fetch width indicator is stored in a memory-area property storage located in the first memory region.

8. The computer-implemented method of claim 1, wherein the data fetch width indicator is stored in a segment table entry.

9. The computer-implemented method of claim 1, wherein determining, by the counter management module, the update to the data fetch width indicator corresponding to the first memory region based on the counter comprises:
- comparing the count to the predetermined threshold; and
- in response to the count being greater than or equal to the predetermined threshold, updating the data fetch width indicator to facilitate wider fetches for the first memory region.

10. The computer-implemented method of claim 1, wherein maintaining, the count of the number of times adjacent cache lines in the cache memory corresponding to the first memory region are touched by the processor in conjunction with the execution of the first application by the processor comprises:
- based on a first cache line associated with the first memory region being evicted from the cache memory:
  - determining, based on a use indicator associated with the first cache line and a use indicator associated with a second cache line, the second cache line being an adjacent cache line to the first cache line, that the adjacent cache lines were touched;
  - based on the determining that the adjacent cache lines were touched, incrementing the counter; and
  - based on the determining that the adjacent cache lines were not touched, decrementing the counter.

11. The computer-implemented method of claim 10, wherein a use indicator of a cache line is indicative that the cache line was touched based one or more of a read access of the cache line, a write access of the cache line, and zeroing of the cache line.

12. The computer-implemented method of claim 1, wherein the data fetch width indicator specifies a number of cache lines to use for fetching data into the cache memory from the main memory.

13. A computer program product for implementing counter-based wide fetch management in a computer system that comprises a processing circuit, a cache memory, and a main memory, the computer program product comprising a computer readable storage medium having program instructions embodied therewith, wherein the computer readable storage medium is not a signal, the program instructions readable by the processing circuit to cause the processing circuit to perform a method comprising:
- assigning, by a counter management module, a counter from a set of counters, to a first memory region in the main memory, wherein the first memory region is allocated to a first application that is executed by the processing circuit;
- maintaining, by the counter, a count of a number of times adjacent cache lines in the cache memory corresponding to the first memory region are touched by the processing circuit within a predetermined duration since the assigning of the counter to the first memory region, wherein the processing circuit touches the cache lines in conjunction with execution of the first application;
- updating, by the counter management module, a data fetch width indicator corresponding to the first memory region in response to the count being at least a predetermined threshold value within the predetermined duration since the assigning of the counter to the first memory region; and
- assigning, by the counter management module, the counter to a second memory region in the main memory in response to the count being less than the predetermined threshold value within the predetermined duration since the assigning of the counter to the first memory region.

14. The computer program product of claim 13, wherein the method further comprises disabling the counter by the counter management module in response to the count being at least the predetermined threshold value within the predetermined duration since the assigning of the counter to the first memory region.

15. The computer program product of claim 13, wherein the method further comprises disabling the counter by the counter management module based on the elapsing of the predetermined duration.

16. The computer program product of claim 13, wherein the method further comprises:
- determining, by the counter management module, that a predetermined number of fetches from the main memory to the cache memory have been performed from the first memory region since the assigning of the counter to the first memory region;
- disabling the counter by the counter management module based on the performing of the predetermined number of fetches; and
- in response, reassigning the counter to a second memory region in the main memory, the second memory region being distinct from the first memory region.

17. The computer program product of claim 13, wherein determining, by the counter management module, the update to the data fetch width indicator corresponding to the first memory region based on the counter comprises:
  comparing the count to the predetermined threshold; and
  in response to the count being greater than or equal to the predetermined threshold, updating the data fetch width indicator to facilitate wider fetches for the first memory region.

18. The computer program product of claim 13, wherein maintaining, the count of the number of times adjacent cache lines in the cache memory corresponding to the first memory region are touched by the processing circuit in conjunction with the execution of the first application by the processing circuit comprises:
  based on a first cache line associated with the first memory region being evicted from the cache memory:
    determining, based on a use indicator associated with the first cache line and a use indicator associated with a second cache line, the second cache line being an adjacent cache line to the first cache line, that the adjacent cache lines were touched;
    based on the determining that the adjacent cache lines were touched, incrementing the counter; and
    based on the determining that the adjacent cache lines were not touched, decrementing the counter.

19. The computer program product of claim 18, wherein a use indicator of a cache line is indicative that the cache line was touched based one or more of a read access of the cache line, a write access of the cache line, and zeroing of the cache line.

20. The computer program product of claim 13, wherein the data fetch width indicator specifies a number of cache lines to use for fetching data into the cache memory from the main memory.

* * * * *